July 22, 1941.  V. H. VAN SANT  2,249,921
BOLT AND NUT LOCK
Filed Sept. 23, 1939
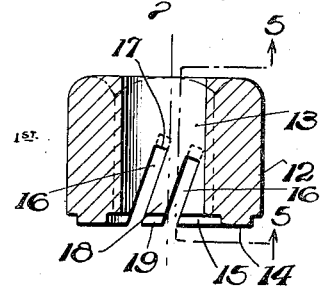
Fig. 1.
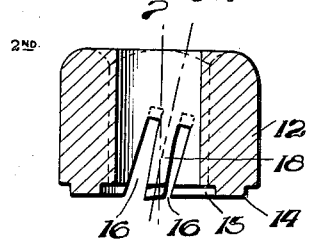
Fig. 2.
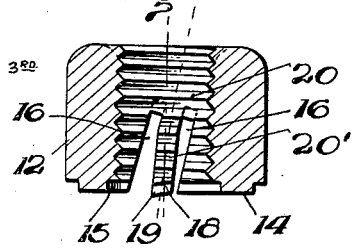
Fig. 3.
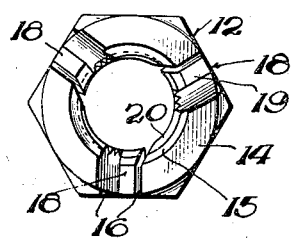
Fig. 4.
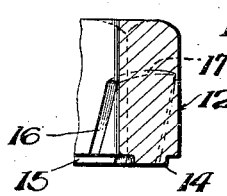
Fig. 5.
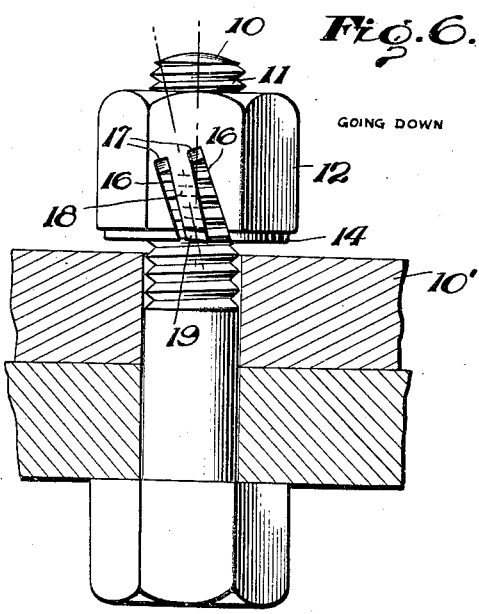
Fig. 7.
Fig. 6.
Inventor
Victor H. Van Sant.
By
Attorney Patented July 22, 1941

2,249,921

UNITED STATES PATENT OFFICE 2,249,921

BOLT AND NUT LOCK

Victor H. Van Sant, Westfield, N. J., assignor of one-third to Wilbur B. Driver, Newark, N. J., and one-third to Henry Kershaw, Belleville, N. J.

Application September 23, 1939, Serial No. 296,314

2 Claims. (Cl. 151—37)

My invention relates to bolt and nut locks.

An important object of the invention is to provide means to prevent improper turning movement of the nut, by exerting a binding action between the threads of the nut and threads of the bolt.

A further object of the invention is to provide means of the above mentioned character which will exert a force longitudinally of the bolt, when it is attempted to unscrew the nut, whereby the nut cannot be removed without elongating the bolt.

A further object of the invention is to provide means which produces a binding action between the screw-threads of the nut and the screw-threads of the bolt, by angularly adjusting portions of the screw-threads of the nut with respect to those of the bolt.

A further object of the invention is to provide a nut having lock means which is a unitary structure.

A further object of the invention is to provide a nut of the above mentioned character which may be manufactured quickly and cheaply and therefore is suitable for commercial use.

Other objects and advantages of the invention will be apparent during the course of the following description.

In the accompanying drawing forming a part of this application and in which like numerals are employed to designate like parts throughout the same.

Figure 1 is a central vertical section through the nut,

Figure 2 is a similar view showing the finger or pawl bent to reduce its inclination, Figure 3 is a similar view showing the screw-threads formed in the nut and finger or pawl, Figure 4 is an elevation of the inner end of the nut, Figure 5 is a section taken on line 5—5 of Figure 1, Figure 6 is a side elevation of the bolt and nut, before the nut is screwed up tight, and, Figure 7 is a similar view showing the nut screwed up tight.

In the drawing, wherein for the purpose of illustration is shown a preferred embodiment of my invention, the numeral 10 designates a bolt having screw-threads 11.

The numeral 12 designates a nut to be arranged upon the bolt. As shown in Figures 1 and 2, the nut 12 is first formed with a smooth bore 13 and an annular flange 14 upon its inner end. At its inner end, the nut is counter-bored, providing a recess 15. This recess has a diameter slightly greater than the all over diameter of the screw-threads 11 of the bolt and hence the bolt will not contact with the wall of the recess 15.

After the formation of the parts thus described, the nut is provided with one or more pairs of parallel slots 16, which are formed in the periphery of the nut and extend from points 17, near the intermediate portion of the nut to and through the inner face of the flange 14. The slots 16 are parallel, when first cut, Figure 1. The slots 16 are inclined or diagonal and are disposed at an angle of substantially 14° to the direction of axis of rotation of the nut, although this angular arrangement may be varied within limits. The slots 16 form between them a finger or pawl 18, having a free edge 19.

The next step in the production of the device is the bending of the finger or pawl 18 to the position shown in Figure 2, wherein the central longitudinal axis of the finger or pawl 18 is generally parallel with the axis of rotation of the nut, but is preferably slightly inclined in a trailing direction with relation to such axis. When the finger or pawl 18 is thus bent, to reduce its inclination, Figure 2, the free edge 19 of the finger or pawl becomes inclined with respect to the face of the flange 14, and this inclined end or edge 19 projects outwardly beyond the face of the flange 14, as shown.

The next step in the production of the device is the tapping of the nut to provide the screw-threads 20. Portions 20' of these screw-threads are formed upon the finger or pawl 18, and cooperate with the other portions of the screw-threads in engaging the screw-threads 11 of the bolt just as if the screw-threads 20 were continuous.

After the nut has been tapped to produce the screw-threads, the nut is hardened and spring-tempered so that the finger or pawl 18 is rendered resilient, and will tend to spring back to the normal position, as shown in Figure 3.

The operation of the device is as follows:

The bolt 10 is passed through the work or surface 10' and the nut 12 is applied to the threaded end of the bolt and is screwed up thereon until the inclined edge 19 of the resilient finger or pawl 18 contacts with the surface 10'. When this occurs, the outer face of the flange 14 is still spaced from the surface 10'. Since the end or edge 19 is inclined, extending downwardly in a rearward direction, when the nut is further turned with the inclined edge 19 contacting with the surface 10', the free end of the finger or pawl 18 drags upon the surface and the resilient pawl or finger 18 is bent laterally in a trailing direction, and this causes the thread portions 20' to yieldingly press against threads 11 producing a binding action between threads, preventing accidental unscrewing of the nut. At the same time, since the central longitudinal axis of the finger or pawl 18 has been shifted in a trailing direction past dead center, the pawl or finger being under compression, its tension tends to swing the same laterally in a leading direction, but this cannot occur without the elongation of the screw-threaded portion of the bolt, and hence the edge 19 has a wedging action with the surface 10'. It is thus seen that as the bolt is screwed in, after the edge 19 engages the surface 10', the pawl or finger 18 is swung laterally in a trailing direction so that the central longitudinal axis of the finger or pawl is shifted further beyond dead center, and the further the nut is screwed up, the more difficult it will be to remove the nut by a turning movement in a reverse direction.

It is to be understood that the forms of my invention herewith shown and described are to be taken as preferred examples of the same and that various changes in the shape, size, and arrangement of parts may be resorted to without departing from the spirit of my invention or the scope of the subjoined claims.

Having thus described my invention, what I claim is:

1. In a bolt and nut lock, a bolt having a screw-threaded portion, a nut having a bore provided with screw-threads, said nut being provided in its periphery with a pair of slots which are circumferentially inclined and extend through its inner end and forming a finger between the slots, said finger having its longitudinal axis originally circumferentially inclined with respect to the nut and its free end terminating with the free ends of the slots, said finger being bent so that its longitudinal axis extends more nearly parallel with the turning axis of the nut and the free end of the finger extends beyond the inner ends of the slots, said finger having portions of the screw-threads of the nut formed therein, said finger being resilient, said finger being shifted laterally in a trailing direction by engaging the work when the nut is screwed up.

2. In a bolt and nut lock, a bolt having a screw-threaded portion, a nut having a bore provided with screw-threads, said nut being provided in its periphery with a recess which extends through its inner end and having a resilient finger formed integral therewith and extending longitudinally through the recess and having its free end projecting beyond the inner end of the recess, said resilient finger having portions of the screw-threads of the nut formed therein, said finger having its longitudinal axis extending longitudinally of the axis of rotation of the nut, said finger being shifted laterally in a trailing direction by engagement with the work when the nut is screwed up.

VICTOR H. VAN SANT.